(12) United States Patent
Marcum

(10) Patent No.: US 7,591,079 B1
(45) Date of Patent: Sep. 22, 2009

(54) GAUGE FOR DETERMINING ANGLE OF SLOPED GROUND AND METHOD OF USING SAME

(76) Inventor: Tim Marcum, P.O. Box 768, Beavercreek, OR (US) 97004

( * ) Notice: Subject to any disclaimer, the term of this patent is extended or adjusted under 35 U.S.C. 154(b) by 13 days.

(21) Appl. No.: 12/074,075

(22) Filed: Feb. 28, 2008

(51) Int. Cl.
E01C 23/01 (2006.01)
G01B 3/56 (2006.01)

(52) U.S. Cl. .............................. 33/521; 33/1 H; 33/282; 33/534

(58) Field of Classification Search ................... 33/1 H, 33/1 BB, 282, 283, 354, 379, 534, 563
See application file for complete search history.

(56) References Cited

U.S. PATENT DOCUMENTS

| | | | |
|---|---|---|---|
| 1,203,521 A | 10/1916 | Ford | |
| 2,042,031 A | 5/1936 | Watson | |
| 2,128,863 A | 8/1938 | Turrian | |
| 2,277,071 A | 3/1942 | Cassell | |
| 2,309,855 A | 2/1943 | Maddox | |
| 2,791,836 A | 5/1957 | Gerber | |
| 3,009,250 A | 11/1961 | Schock | |
| 3,967,381 A | 7/1976 | Chesbro | |
| 4,133,116 A | 1/1979 | Devine et al. | |
| 4,260,151 A | 4/1981 | Weaver | |
| 4,497,117 A | 2/1985 | Wrobley et al. | |
| 4,731,933 A * | 3/1988 | Cope ............................ | 33/534 |
| 4,788,774 A * | 12/1988 | Boone .......................... | 33/534 |
| 4,995,169 A | 2/1991 | Lunden | |
| 5,117,560 A | 6/1992 | Nevins | |
| 5,461,791 A | 10/1995 | Piety | |
| 6,457,247 B1 | 10/2002 | Lin | |
| 6,510,618 B2 * | 1/2003 | Tomiser et al. ................. | 33/534 |
| 6,874,240 B1 | 4/2005 | Cruttenden | |
| 7,043,850 B2 * | 5/2006 | Brady .......................... | 33/534 |
| 7,100,295 B1 * | 9/2006 | Chang .......................... | 33/379 |
| 7,188,427 B2 | 3/2007 | Johnson | |
| 2002/0133961 A1 * | 9/2002 | Tomiser et al. ................. | 33/534 |
| 2002/0148126 A1 | 10/2002 | Smith et al. | |
| 2007/0220765 A1 | 9/2007 | Montgomery | |

FOREIGN PATENT DOCUMENTS

| | | |
|---|---|---|
| FR | 2328945 | 5/1977 |
| JP | 56040706 | 4/1981 |
| RU | 2064743 C | 8/1996 |

* cited by examiner

Primary Examiner—G. Bradley Bennett
(74) Attorney, Agent, or Firm—Chernoff, Vilhauer, McClung & Stenzel, LLP

(57) ABSTRACT

A gauge for determining the angle of sloped ground includes a panel, having a transparent window located in it, which can be held by a user so that the sloped ground can be viewed through the window. The panel has a spatial reference associated with it which allows the panel to be oriented properly with respect to the horizontal or vertical. Inscribed on the window are a positioning indicia and a plurality of lines which radiate outwardly from the positioning indicia at specific angles with respect to the horizontal. In use the panel is held such that the positioning indicia is located on the slope. The user can then determine which one of the lines overlies the slope. The angle associated with that line is the angle of the slope.

23 Claims, 5 Drawing Sheets

GAUGE FOR DETERMINING ANGLE OF SLOPED GROUND AND METHOD OF USING SAME

BACKGROUND OF THE INVENTION

This invention relates to a gauge for determining the angle of sloped ground, and in particular for determining this angle with a hand-held gauge.

When a construction project creates a sloped section of ground the permissible angle of the slope relative to the horizontal or vertical is established by one or more standards in order to prevent cave-in. However, unless a surveyor is on site it is difficult to determine whether the angle of the slope falls within the applicable standard. Where the sloped sides are steep, the problem of determining the angles of the sloped sides is even more difficult because a person cannot stand on the sloped side walls without fear of causing a cave-in. In many types of excavation it is even dangerous to stand at the bottom of the excavation.

Inclinometers can be used to measure excavation slopes but they have inherent problems. Inclinometers will only measure the angle of a small portion of a slope. However, ground slopes by their nature are uneven. As a result, with an inclinometer it is necessary to take multiple measurements while standing on the slope and then average them.

SUMMARY OF THE INVENTION

The subject invention provides a hand-held gauge for determining the angle of sloped ground. The gauge comprises a panel having a transparent window through which the user can view the sloped surface. The panel includes a spatial reference which allows the gauge to be properly oriented relative to the horizontal or vertical. The window has a positioning indicia inscribed on it and a plurality of lines radiate outwardly from the positioning indicia at specific angles with respect to the spatial reference. A user holds the gauge so that the slope can be viewed through the window and the gauge is oriented such that the spatial reference indicates that the gauge is aligned horizontally or vertically and the positioning indicia overlies a point on the slope. The viewer can then determine which of the lines overlies the slope, and as a result, the angle of the slope.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
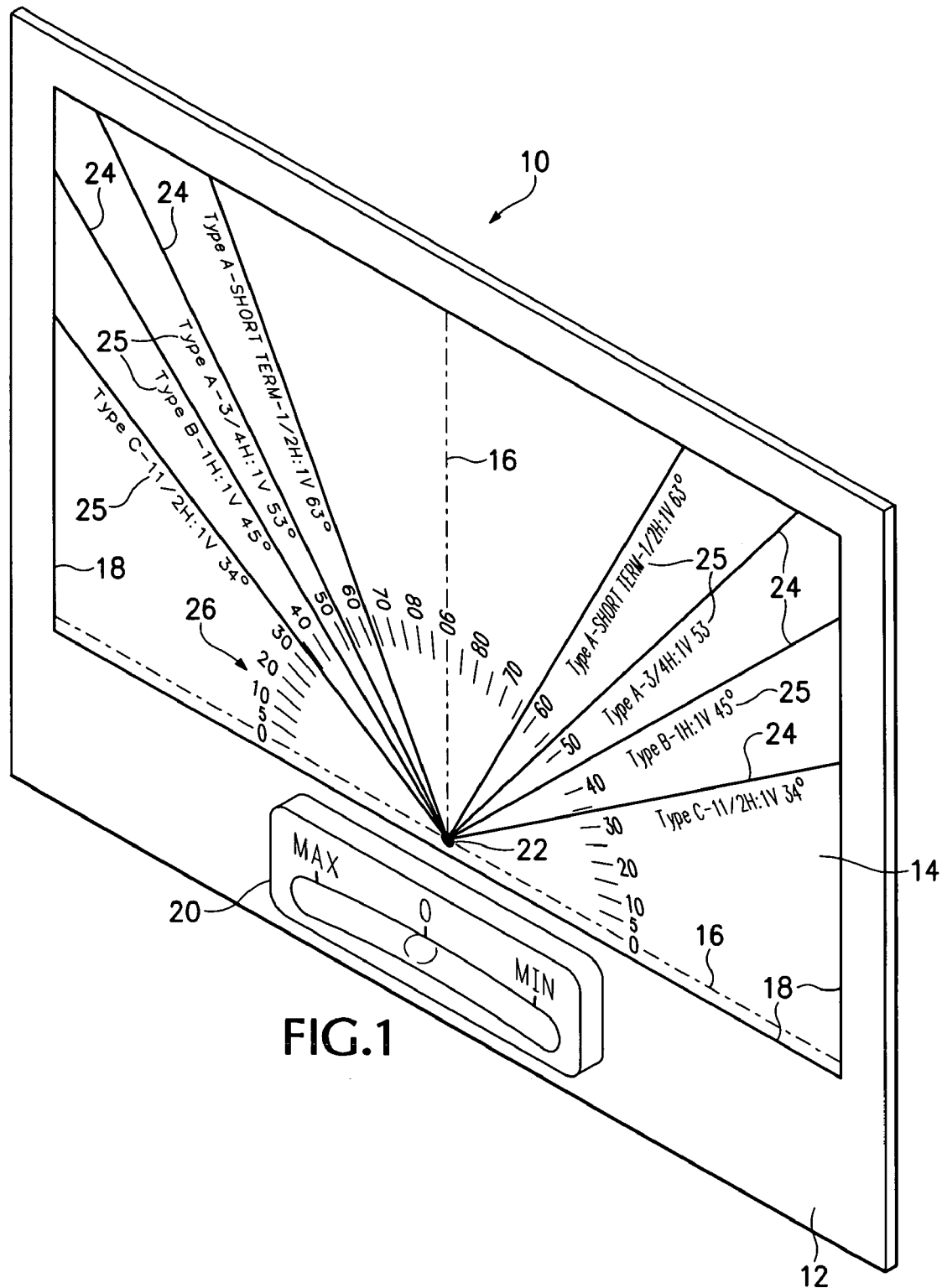
FIG. 1 is a perspective view of a gauge for determining angles of sloped ground embodying the subject invention.

Referring now to the drawings, a gauge 10 is used for determining the angle of sloped ground. The gauge comprises a panel 12 which is arranged to be held in a user's hand, FIGS. 2 and 3, and has a transparent window 14 which the user can see through. In the embodiment illustrated the entire panel 12 is transparent and preferably is made from a thin sheet of plastic, such as polycarbonate. The sheet needs to only be thick enough to be self-supporting. If desired those portions of the panel 12 that are not encompassed by the window 14 can be non-transparent and can be thicker than the window.

As will be more fully explained later, when in use the gauge needs to first be oriented relative to the horizontal or vertical. Accordingly, associated with the panel is a spatial reference which allows the panel to be properly oriented. This could be a line 16 which is inscribed in the window or an edge 18 of the window. This line or edge is aligned with a surface on the ground that is horizontal or vertical, or nearly horizontal or vertical. If it is desired to have more accuracy in orienting the panel a level, such as the bubble inclinometer 20 illustrated, it can be placed on the panel.

Located on the panel is a positioning indicia, which in the embodiment illustrated is a small dot 22. If the window is the only portion of the panel that is transparent the positioning indicia preferably would be located on the window 14, but it could be located on a non-transparent portion of the panel adjacent to the window. In the embodiment illustrated the positioning indicia is located near the bottom of the window generally at the horizontal center of the window. Also located on the window 14 are a series of lines 24 which project outwardly from the positioning indicia 22. The lines 24 are oriented at selected angles with respect to horizontal. The angles correspond to the angles specified in standards for ground slopes for surfaces such as the sides of a specific type of excavation, cut for roadway, slope of landscape area, etc. If desired a description 25 of the particular standard can be inscribed next to each line 24. Each line 24 can be of a different color so that a particular standard can readily be identified for comparing a slope against.

Preferably the lines 24 are arranged in pairs with one line in each pair radiating from the positioning indicia in each direction. This allows measuring both right and left side slopes of an excavation at the same time. If desired a protractor 26 can be inscribed on the window 14. The protractor preferably extends 90 degrees from both sides of the horizontal spatial reference line 16. Both the horizontal and vertical spatial reference lines preferably pass through the positioning indicia 22. In the preferred embodiment the various materials are printed on the window but they could be etched in the plastic, applied as a decal or any other method for accomplishing this.

Figure 2:
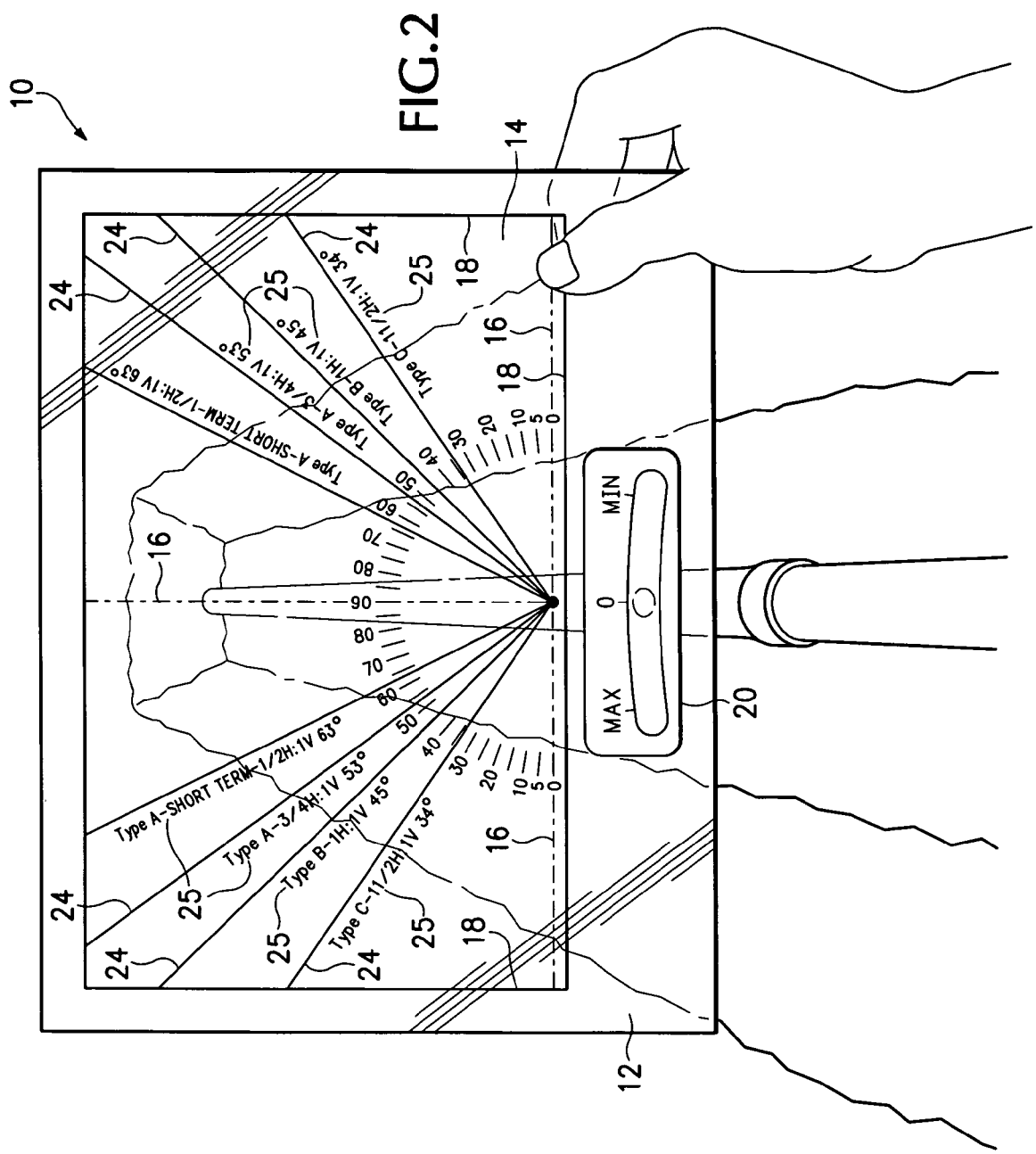
FIG. 2 is a perspective view of the gauge held over an excavation in a manner in which the angle of the slope on both sides of the excavation can be measured.
Figure 3:
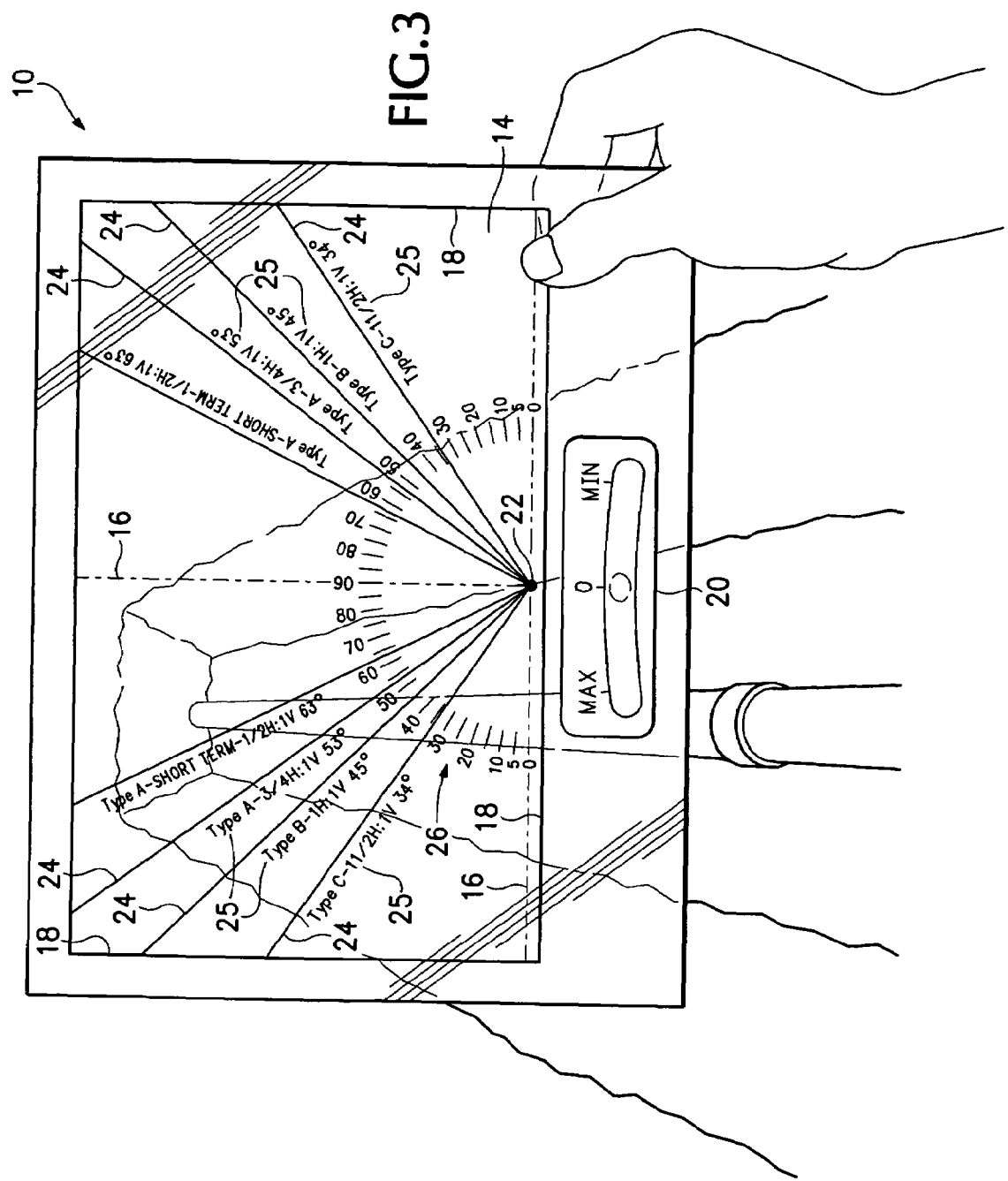
FIG. 3 is a perspective view similar to FIG. 2 except that the gauge is oriented to measure the slope on only one side of an excavation.

The gauge is used by holding it in front of the user, FIGS. 2 and 3. The spatial reference is used to orient the gauge. If a single slope is being measured, the gauge is positioned such that the positioning indicia 22 appears to be located on that slope, FIG. 3. If the gauge is being used to simultaneously measure the slope on both sides of an excavation, it is positioned such that the positioning indicia appears to be located at the center of the excavation, FIG. 2. In either case the line 24 that appears to be at a right angle α with the top of the excavation is the line that indicates the angle of the slope. If desired, an object 28, such as a rope or the ladder shown in FIG. 4, can be placed on the slope to increase the accuracy of the gauge.

Typically the user would be standing at the top of the slope, particularly with a narrow excavation which possibly could cave in and would be difficult to enter. Because the user is above the bottom of the slope and the positioning indicia is placed at the bottom of the slope, there is a slight amount of parallax and the lines may not provide the exact angle of the slope. It has been found, however, that this normally results in the slope being slightly less than indicated which means that the slope will normally be within the standard associated with that line. In a more open excavation or one with a shallower slope the user could stand at the bottom of the excavation.

While the foregoing refers to the gauge being used by a person standing, the gauge can be used many other ways. The user can be sitting in a vehicle or piece of construction equipment, or the gauge can be attached to the vehicle or equipment. The gauge can even be used under water by a diver. In addition it is not necessary for the user to have a completely clear line of sight to the slope being measured. Equipment, pipes, fencing, etc. located on or projecting into the view of the slope do not prevent the gauge from being used. All that is necessary is that the user can view enough of the slope to make a measurement.

Figure 4:
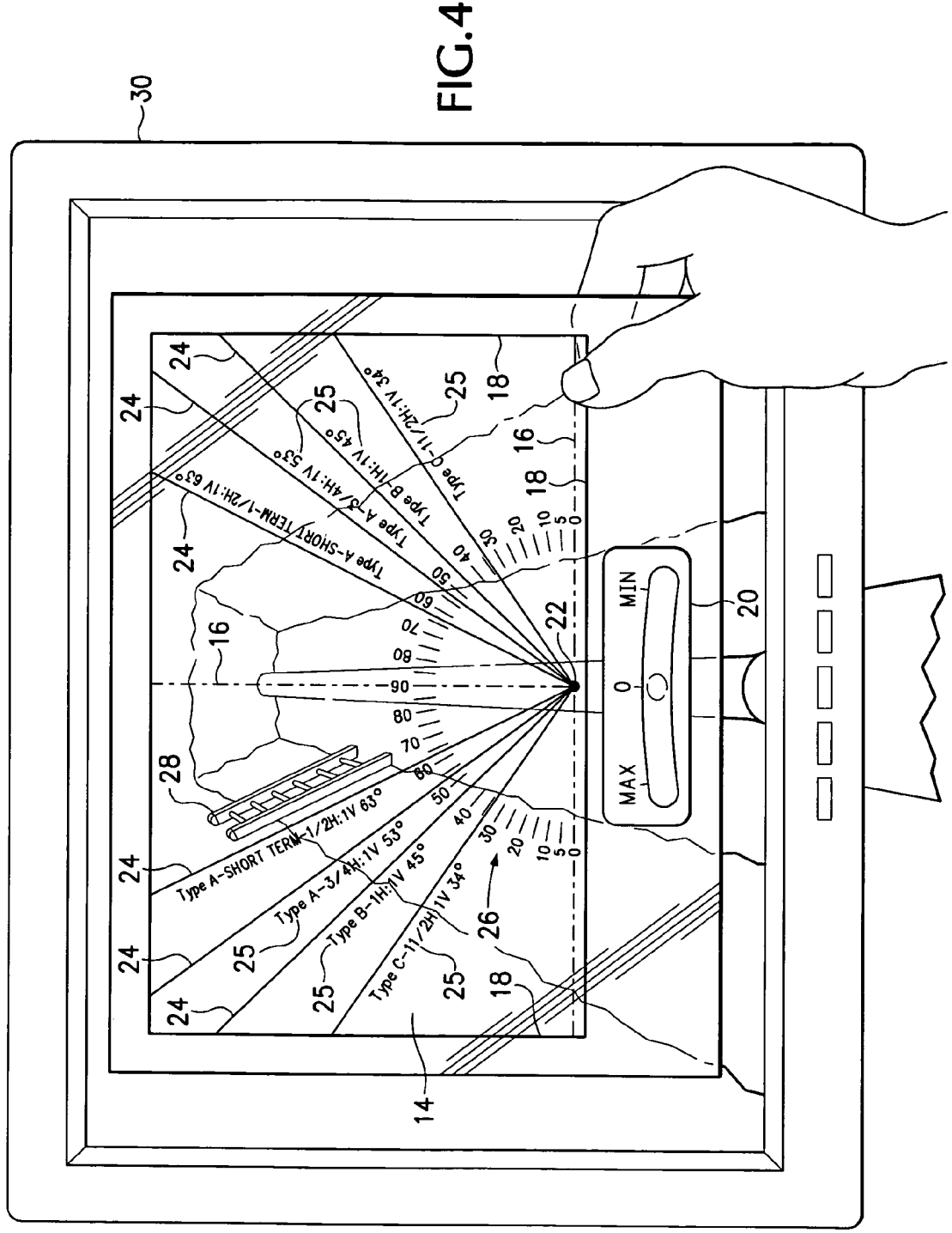
FIG. 4 is an elevation view showing the gauge held over an image of an excavation being displayed on a monitor.
Figure 5:
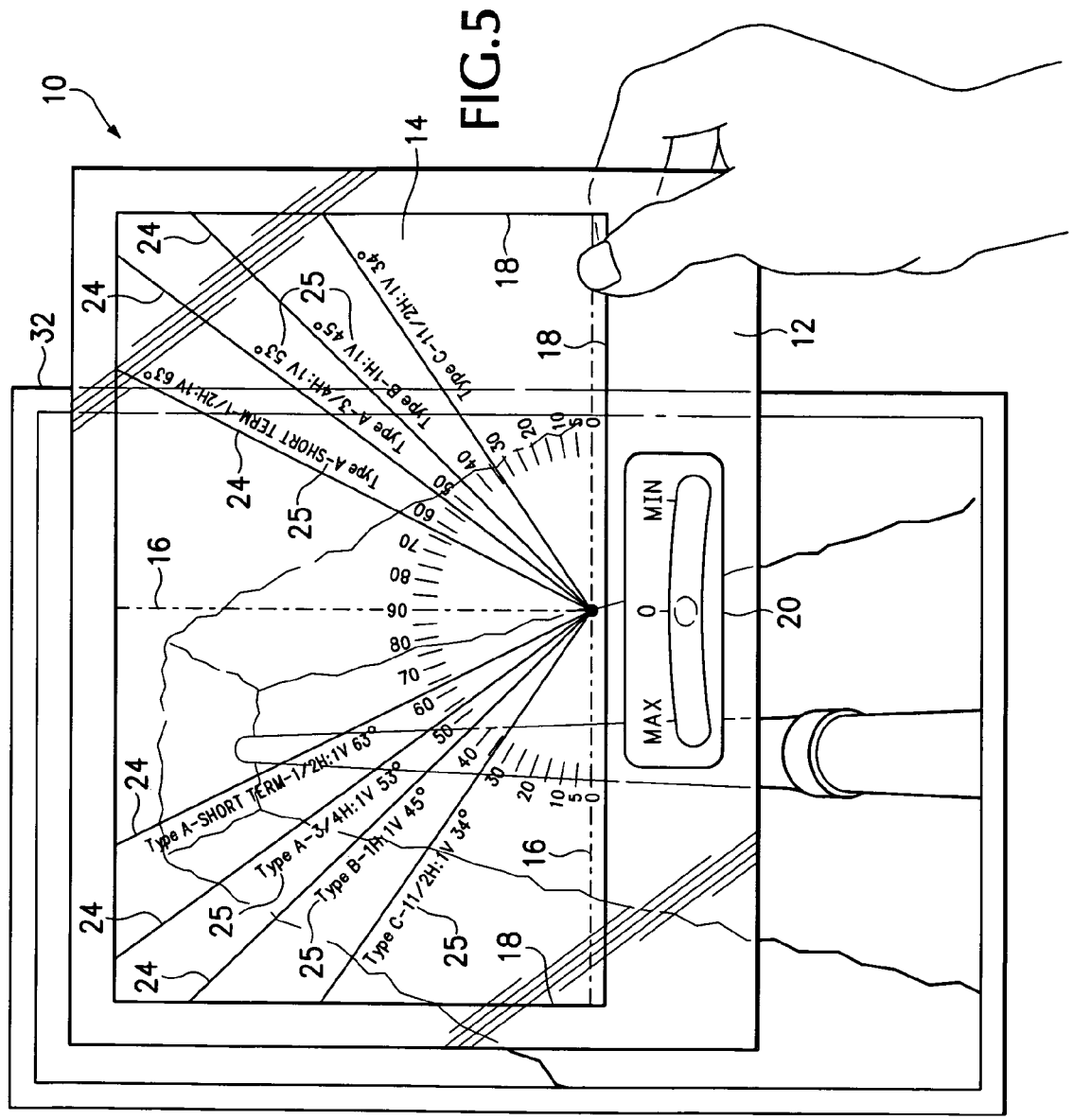
FIG. 5 is an elevation view showing the gauge overlying a photograph of an excavation.

The gauge 10 can also be used to measure the angle of a slope off-site. Referring to FIG. 4, one way of doing this is to lay the gauge over a monitor 30 which is displaying an image of the slope. The gauge is aligned and read much the same way as it is when it is used in the field. Referring to FIG. 5, another way of measuring a slope off-site is to lay the gauge over a photograph 32 of the slope. Again the gauge is aligned and read much the same way as it is when it is used in the field.

The gauge 10 also can be oriented as described above to determine the angle of a slope and a photograph can be taken of the gauge, showing the slope and the angle. This photograph then can be used to commemorate that the slope has been measured.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A device for determining the angle of sloped ground comprising:
   (a) a panel which is configured to be held in front of a user;
   (b) said panel having a transparent window which the user can see through;
   (c) said window having a positioning indicia inscribed thereon;
   (d) a spatial reference associated with said panel;
   (e) a plurality of radial lines inscribed on said window, said radial lines radiating from said positioning indicia and being located at specific angles with respect to the horizontal; wherein
   (f) a user looking through said window can determine the angle of sloped ground by using the spatial reference to orient said panel spatially, locating said positioning indicia on the slope and observing which of said radial lines overlies the slope being measured.

2. The device of claim 1 including a protractor inscribed on said window, said protractor extending 90 degrees on each side of its center and with the center of said base being located at said positioning indicia.

3. The device of claim 1 wherein said spatial reference is an edge of said window.

4. The device of claim 1 wherein said spatial reference is a line inscribed on said window.

5. The device of claim 1 wherein said spatial reference is a level indicator located on said gauge.

6. The device of claim 1 wherein said radial lines are provided in pairs with one line in each pair radiating outwardly on each side of said positioning indicia.

7. The device of claim 1 wherein said panel is a clear plastic sheet.

8. The device of claim 1 wherein said radial lines are at angles which correspond to slope angles that correspond to specific standards.

9. The device of claim 1 wherein each said radial line has a distinctive color.

10. A method for determining ground slope comprising:
    (a) providing a gauge having a spatial reference associated therewith and a transparent window with a positioning indicia and a plurality of radial lines radiating outwardly from said positioning indicia inscribed thereon;
    (b) holding said gauge so that a slope can be viewed through it;
    (c) aligning the gauge with the spatial reference so that it is oriented horizontally;
    (d) orienting the gauge such that the positioning indicia is located on the slope; and
    (e) determining which one of the radial lines overlies the slope being measured.

11. The method of claim 10 including the step of first standing proximate the bottom of the slope being measured.

12. The method of claim 10 including the step of first standing proximate the top of the slope being measured.

13. The method of claim 10 including the step of placing an elongate object on the slope and determining which radial line is aligned with this elongate object.

14. The method of claim 10 wherein the radial lines radiate outwardly from the positioning indicia in both directions, including the step of determining which ones of the radial lines radiating in each direction overlies the respective slope of opposed slopes.

15. A method of determining ground slope comprising:
    (a) providing a gauge having a spatial reference associated therewith and a transparent window with a positioning indicia and a plurality of radial lines radiating outwardly from said positioning indicia inscribed thereon;
    (b) placing said gauge over a photograph of a ground slope;
    (c) aligning the device such that the spatial reference is aligned with the horizontal in the photograph and the positioning indicia is located on the slope in the photograph; and
    (d) determining which one of the radial lines overlies the slope on the photograph.

16. A method of determining ground slope comprising:
    (a) Providing a gauge having a spatial reference associated therewith and a transparent window with a positioning indicia and a plurality of radial lines radiating outwardly from said positioning indicia inscribed thereon;
    (b) placing said gauge over a monitor displaying a ground slope;
    (c) aligning the gauge such that the spatial reference is aligned with the horizontal in the display on the monitor and the positioning indicia is located on the slope display on the monitor; and
    (d) determining which one of the radial lines overlies the slope being displayed.

17. A method for determining ground slope comprising:
    (a) providing a gauge having a spatial reference associated therewith and a transparent window with a positioning indicia and a plurality of radial lines radiating outwardly from said positioning indicia inscribed thereon;

(b) holding said gauge so that a slope can be viewed through it;
(c) aligning the gauge with the spatial reference so that it is oriented vertically;
(d) orienting the gauge such that the positioning indicia is located on the slope; and
(e) determining which one of the radial lines overlies the slope being measured.

18. The method of claim 17 including the step of first standing proximate the bottom of the slope being measured.

19. The method of claim 17 including the step of first standing at the top of the slope being measured.

20. The method of claim 17 including the step of placing an elongate object on the slope and determining which radial line is aligned with this elongate object.

21. The method of claim 17 wherein the radial lines radiate outwardly from the positioning indicia in both directions, including the step of determining which ones of the radial lines radiating in each direction overlies the respective slope of opposed slopes.

22. A method of determining ground slope comprising:
(a) providing a gauge having a spatial reference associated therewith and a transparent window with a positioning indicia and a plurality of radial lines radiating outwardly from said positioning indicia inscribed thereon;
(b) placing said gauge over a photograph of a ground slope;
(c) aligning the device such that the spatial reference is aligned with the vertical in the photograph and the positioning indicia is located on the slope in the photograph; and
(d) determining which one of the radial lines overlies the slope on the photograph.

23. A method of determining ground slope comprising:
(a) Providing a gauge having a spatial reference associated therewith and a transparent window with a positioning indicia and a plurality of radial lines radiating outwardly from said positioning indicia inscribed thereon;
(b) placing said gauge over a monitor displaying a ground slope;
(c) aligning the gauge such that the spatial reference is aligned with the vertical in the displayed on the monitor and the positioning indicia is located on the base of the slope display on the monitor; and
(d) determining which one of the radial lines overlies the slope being displayed.

* * * * *